United States Patent
Miyoshi et al.

(10) Patent No.: US 10,445,353 B2
(45) Date of Patent: Oct. 15, 2019

(54) SENTENCE RETRIEVAL METHOD AND SENTENCE RETRIEVAL SYSTEM

(71) Applicant: Hitachi, Ltd., Chiyoda-ku, Tokyo (JP)

(72) Inventors: Toshinori Miyoshi, Tokyo (JP); Yoshiyuki Kobayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 278 days.

(21) Appl. No.: 15/514,541

(22) PCT Filed: Oct. 6, 2014

(86) PCT No.: PCT/JP2014/076652
§ 371 (c)(1),
(2) Date: Mar. 27, 2017

(87) PCT Pub. No.: WO2016/056043
PCT Pub. Date: Apr. 14, 2016

(65) Prior Publication Data
US 2017/0212954 A1     Jul. 27, 2017

(51) Int. Cl.
*G06F 17/00* (2019.01)
*G06F 16/33* (2019.01)
(Continued)

(52) U.S. Cl.
CPC ........ *G06F 16/3331* (2019.01); *G06F 16/353* (2019.01); *G06F 16/93* (2019.01);
(Continued)

(58) Field of Classification Search
CPC ..... G06F 17/21; G06F 17/2785; G06F 17/279
(Continued)

(56) References Cited

U.S. PATENT DOCUMENTS 7,475,007 B2    1/2009  Kanayama et al.
8,200,477 B2 *  6/2012  Yi ...................... G06F 17/2715
                                                          704/9
(Continued)

FOREIGN PATENT DOCUMENTS

JP    2003-157254 A    5/2003
JP    2012-208728 A   10/2012

OTHER PUBLICATIONS

International Search Report (PCT/ISA/210) issued in PCT Application No. PCT/JP2014/076652 dated Nov. 4, 2014 with English translation (5 pages).
(Continued)

*Primary Examiner* — Daniel Abebe
(74) *Attorney, Agent, or Firm* — Crowell & Moring LLP (57) ABSTRACT

Sentence polarity determination is used to assess whether a sentence is an affirmative expression or a negative expression, and is applied for reputation analysis, etc. Polarity determination determines whether an input sentence is affirmative or negative. When some subject is being talked about, it is sometimes desired to determine whether what is being referred to in the sentence is affirmative or negative, rather than the polarity of the sentence per se. The present invention provides a method for determining the polarity of the sentence by applying a recursive polarity rule based on a dependency structure of the sentence, taking into consideration the portion of the sentence that is being referred to. Use of a recursive rule makes it possible to prevent the number of rules from becoming huge, and thereby to perform efficient polarity determination in terms of memory amount and calculation amount. The length of the dependency needed for polarity determination can also be efficiently controlled.

8 Claims, 9 Drawing Sheets

(51) Int. Cl.
*G06F 16/93* (2019.01)
*G06F 17/27* (2006.01)
*G06F 16/35* (2019.01)

(52) U.S. Cl.
CPC ........ *G06F 17/274* (2013.01); *G06F 17/2775* (2013.01); *G06F 17/2785* (2013.01); *G06F 17/2705* (2013.01); *G06F 17/2795* (2013.01)

(58) Field of Classification Search
USPC .......................................................... 704/10
See application file for complete search history.

(56) References Cited

U.S. PATENT DOCUMENTS

| | | | | |
|---|---|---|---|---|
| 9,189,748 | B2* | 11/2015 | Yamamoto | G06F 17/278 |
| 2005/0091038 | A1* | 4/2005 | Yi | G06F 17/2715 704/10 |
| 2010/0299301 | A1* | 11/2010 | Busch | G06F 17/27 706/46 |
| 2011/0179009 | A1* | 7/2011 | Nam | G06Q 30/02 707/708 |
| 2013/0103623 | A1* | 4/2013 | Burstein | G06N 20/00 706/12 |
| 2017/0249389 | A1* | 8/2017 | Brovinsky | G06Q 30/02 |

OTHER PUBLICATIONS

Japanese-language Written Opinion (PCT/ISA/237) issued in PCT Application No. PCT/JP2014/076652 dated Nov. 4, 2014 (3 pages).
Nakagawa et al., "Dependency Tree-based Sentiment Classification using CRFs with Hidden Variables", Human Language Technologies: The 2010 Annual Conference of the North American Chapter of the ACL, Jun. 2010, pp. 786-794.
Kanayama, "Exploiting Customer's Preference: Leading Edge of User Profiling Technique", IPSJ Magazine, vol. 48, No. 9, Sep. 15, 2007, pp. 1001-1007, with partial English translation (fifteen (15) pages total).
Suganuma et al., "A Textual Analysis Method to Extract Negative Expressions in Writing Tools for Japanese Documents", Transactions of Information Processing Society of Japan, vol. 31, No. 6, Jun. 5, 1990, pp. 792-800, with English abstract (twelve (12) pages total).
Takizawa et al., "Fukushi no Eikyodo o Koryo Shita Kanjo Suitei", Dai 44 Kai Special Interest Group on Language Sense Processing Engineering Shiryo, Nov. 29, 2013, pp. 13-18, with partial English translation (eleven (11) pages total).
Japanese-language Office Action issued in counterpart Application No. 2016-552719 dated Mar. 27, 2018 (five (5) pages).
Extended European Search Report issued in counterpart European Application No. 14903526.3 dated May 11, 2018 (nine (9) pages.

* cited by examiner

| Rule No. | Dependent | Head | Polarity |
|---|---|---|---|
| 1 | Target phrase | for | None |
| 2 | for | is | + |
| 3 | oppose | Target phrase | − |
| ... | | | |

SENTENCE RETRIEVAL METHOD AND SENTENCE RETRIEVAL SYSTEM

TECHNICAL FIELD

The present invention relates to a method for determining the polarity of a sentence and searching for a text.

BACKGROUND ART

Polarity determination that shows whether a sentence is an affirmative expression or a negative expression is used for reputation analysis and the like. Polarity determination includes a method whereby a dictionary in which affirmative words and negative words are recorded in advance is kept, the affirmative words and negative words in a sentence is counted based on the dictionary, and the polarity of the majority is determined to be the polarity of the sentence. However, because sentences may include negations, retractions and the like, a correct determination may not be made simply by counting the words representing affirmative expressions and words representing negative expressions. One polarity determination method statistically analyzes the tendency of appearance of a phrase consisting of not more than n continuous words in affirmative sentences and negative sentences. In this case, if the positions of a negative word and the object of negation in a sentence are close (not more than n), there is a possibility of correct determination. However, as n increases, the number of combinations may become huge. Accordingly, realistically n=3, more or less, is used.

Another polarity determination method employs a dependency structure rather than the positional proximity relationship in the sentence. Non Patent Literature 1 describes a polarity determination method using the dependency structure.

CITATION LIST

Non Patent Literature

Non Patent Literature 1: Dependency Tree-based Sentiment Classification using CRFs with Hidden Variables, Tetsuji et. al., HLT' 10, pp. 786-794, 2010.

SUMMARY OF INVENTION

Technical Problem

During sentence polarity determination, there may be cases where it is desired to determine the polarity with respect to a portion of a sentence that is being referred to, instead of the polarity of the sentence per se. However, because the method of Non Patent Literature 1 is one that determines the polarity of a sentence as a whole, the method is unable to designate a phrase being referred to in a sentence, and then determine the polarity as to whether the sentence itself is positive or negative with respect to the phrase.

Solution to Problem

In order to solve the problem, the configurations set forth in the claims are adopted, for example. While the present application includes a plurality of means for solving the problem, one example is a text search system which includes a search unit that performs a search for a text including a search target phrase that has been input; a determination unit that determines a polarity of the text obtained by the search; and an output unit that outputs a determination result. The determination unit sets the search target phrase as a first determination target phrase, determines a polarity of a first phrase that has a dependency relation with the first determination target phrase, sets a group of the first determination target phrase and the first phrase as the second determination target phrase, and determines the polarity of the text by determining a polarity of a second phrase that has a dependency relation with the second determination target phrase.

A text search method includes a first step of conducting a search for a text including a search target phrase that has been input; a second step of determining a polarity of the text; and a third step of outputting a determination result. The second step includes a process of setting the search target phrase as a first determination target phrase, determining a polarity of a first phrase that has a dependency relation with the first determination target phrase, setting a group of the first determination target phrase and the first phrase as a second determination target phrase, and determining a polarity of the text by determining a polarity of a second phrase that has a dependency relation with the second determination target phrase.

Advantageous Effects of Invention

According to the present invention, the polarity with respect to a portion of a sentence that is being referred to can be determined.

DESCRIPTION OF EMBODIMENTS

First Embodiment

In a first embodiment, an example of determining polarity as to, e.g., whether a sentence is affirmative or negative with respect to a given phrase on the basis of a polarity determination rule having a recursive configuration will be described.

While the present example will be described in terms of being affirmative or negative, the method of the present embodiment may be applied to other various types of polarity, such as in terms of being emotionally affirmative or negative; adoption or non-adoption; or merit or demerit, depending on the way a rule is interpreted.

Figure 1:
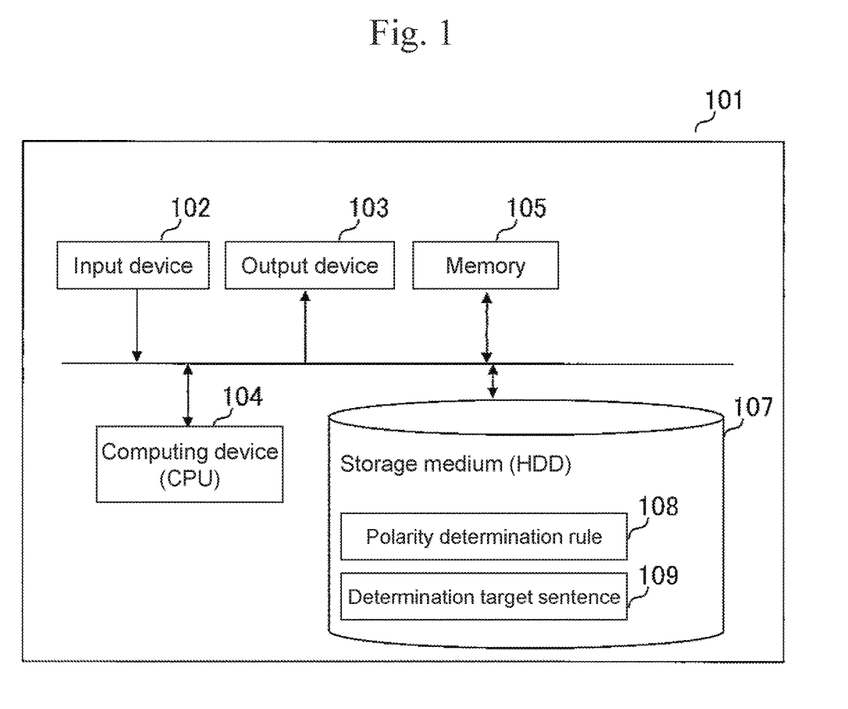
FIG. 1 illustrates a hardware configuration example of a polarity determination device according to an embodiment of the present invention.

FIG. 1 is a block diagram of a hardware configuration example of a polarity determination device 101 according to the embodiment of the present invention.

The polarity determination device 101 according to the embodiment of the present invention includes an input device 102, an output device 103, a computing device 104, a memory 105, and a storage medium 106.

The input device 102 is a human interface such as a mouse, a keyboard, a touch panel and the like, and accepts an input to the polarity determination device 101.

The output device 103 is a display or a printer, for example, for outputting the result of computation by the polarity determination device.

The storage medium 107 is a storage device for storing various programs for implementing polarity determination by the polarity determination device 101, results of execution of a polarity determination process, and the like. The storage medium 107 is a nonvolatile storage medium (such as a magnetic disk drive or a nonvolatile memory), for example.

In the memory 105, the programs or data stored in the storage medium 107 are loaded.

The computing device 104 is a device (processor) for executing the programs loaded into the memory 105, and may include a CPU, a GPU and the like. The processes and computations described below are executed by the computing device 104.

The polarity determination device 101 may be a computer system configured from a single computer, or a computer system configured from a server and a client terminal.

The polarity determination device 101 is a computer system configured on a single computer or on a plurality of logically or physically configured computers. The polarity determination device 101 may be operated on a separate thread in the same computer, or operated on a virtual computer constructed on a plurality of physical computer resources.

The program executed by the computing device 104 is provided to each server via a removable medium (such as a CD-ROM or a flash memory) or a network, and stored in a nonvolatile storage device which is a non-transitory storage medium. Accordingly, the computer system may be provided with an interface for reading removable media.

The storage medium 107 stores a polarity determination rule 108 and a determination target sentence 109. The storage medium 107 may be housed in a storage device connected to the polarity determination device 101, or provided by an external computer. When a determination target sentence is provided from an input unit, the determination target sentence 109 may not be present.

In the polarity determination rule 108, a dictionary comprising rules to be used for sentence polarity determination is stored. The polarity determination rule 108 is created in advance manually or by machine learning, for example. Examples of the polarity determination rule used in the present embodiment are described with reference to FIG. 5, together with sentence dependency structures. In the present embodiment, it is determined whether a sentence is affirmative or negative with respect to a certain determination target phrase. Accordingly, a rule for determining what phrase dependency with respect to the target phrase makes a sentence affirmative or negative will be described.

For example, when the determination target phrase is X, a sentence "Y oppose X." means opposing X, so that the sentence can be considered to be negative with respect to X. A sentence "Y like X." can be considered to be affirmative with respect to X.

In the present invention, the affirmative/negative determination with respect to the portion being referred to is made by recursively repeatedly applying a polarity determination based on a dependency structure with respect to the target phrase.

Figure 6:
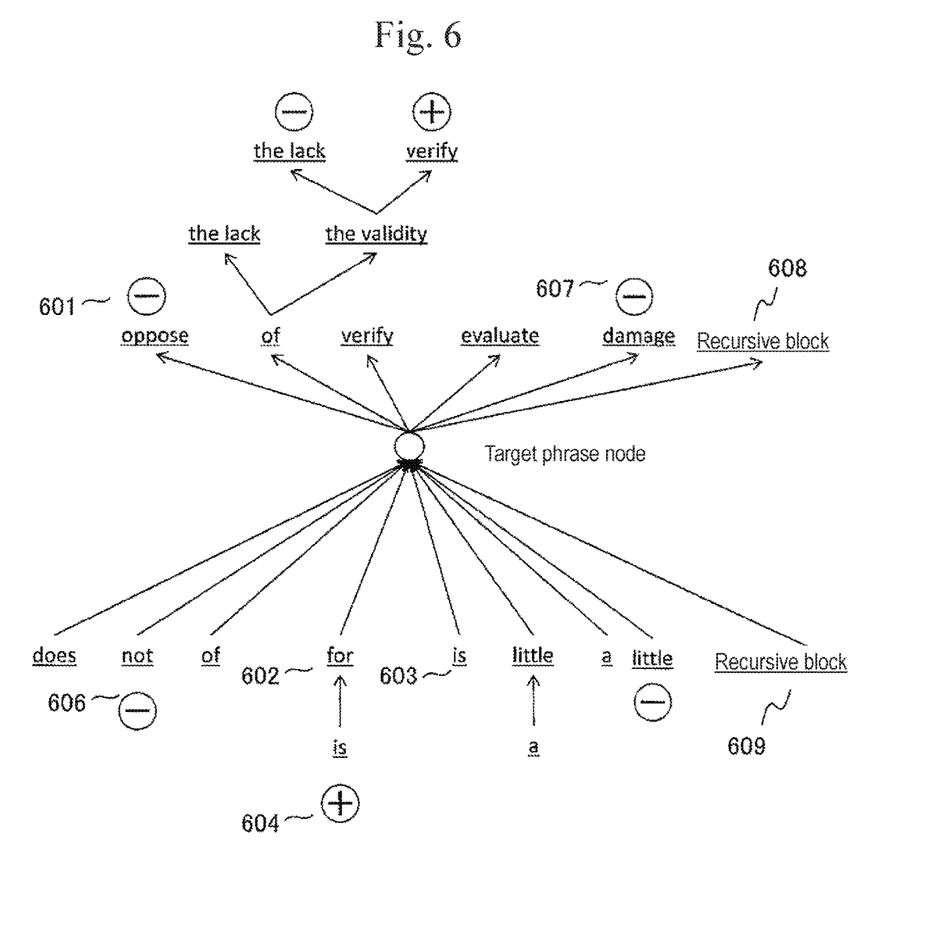
FIG. 6 illustrates an example of polarity determination rules using a tree structure.

With reference to FIG. 6, the polarity determination rule will be described. FIG. 6 illustrates an example of the polarity determination rule using a tree structure. A word group of words and phrases constitutes a node, and arrows connecting nodes represent dependencies. The + and − signs above or below the nodes respectively represent the plus and minus polarities; no sign represents no-polarity. For example, if the target phrase is dependent on "not" (rule 605), the polarity is minus; if the target phrase is dependent on "for" and then "is" (rule 604), the polarity is plus. The polarity rule will be described in greater detail below with reference to a description of a polarity determination method using the polarity rule.

Figure 5:
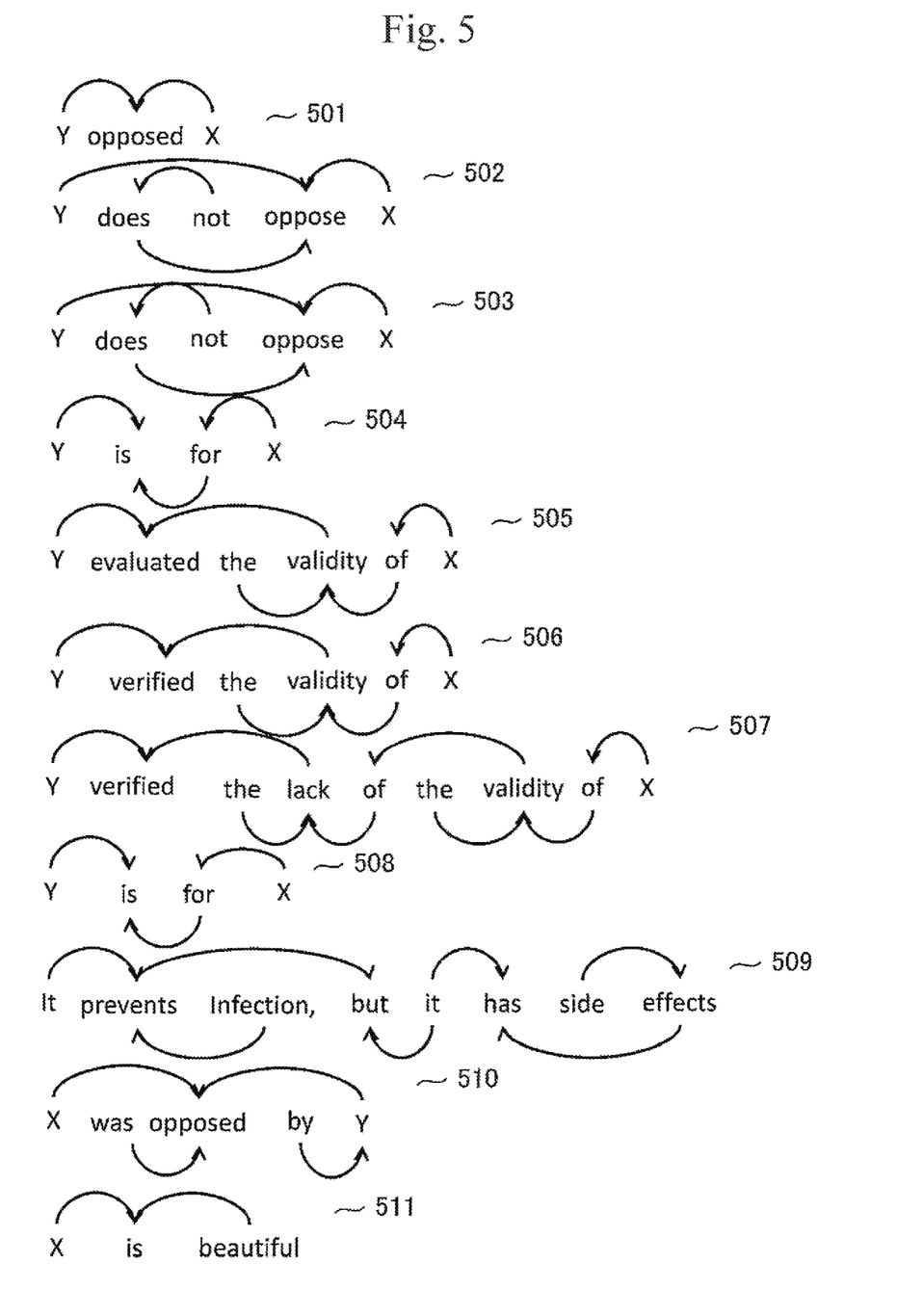
FIG. 5 illustrates examples of dependency structures used for polarity determination.

In the present invention, polarity determination is performed by recursively applying the polarity determination rule with respect to the portion being referred to. An application example will be described. For example, in the sentence "Y does not oppose X", the dependency structure is as illustrated in FIG. 5 at 502.

In the following, a procedure for determining the polarity of "Y does not oppose X" when X is the portion being referred to in an application of the rule of FIG. 6 will be described with reference to FIG. 2. In the polarity determination, the input includes a sentence and the portion being referred to, and the output is a polarity determination result indicating affirmative, negative, or neither.

First, in the dependency structure parsing 201, the dependency structure of the sentence is parsed. Various methods for parsing dependency structure have been proposed, and any of the existing methods may be employed. FIG. 5 illustrates several examples of the sentence dependency structure.

Then, in target phrase initial setting 202, the current target phrase to be parsed is set. Herein, a phrase that constitutes the portion being referred to that is input is set. In the example of 502, X is the target phrase. X may be a word or may comprise a plurality of words. When a synonym processing or an orthographic variation processing is performed, and if the sentence contains a phrase which is close to the input phrase, such as a synonym of the portion being referred to that has been input, that phrase may be designated as the target phrase to be parsed. The words of the portion being referred to that is input may not be words, phrases and the like, and may be instead anything that expresses a set of words or phrases. Herein, that which matches the expression is set as the target phrase.

Then, in polarity initial setting 203, the polarity of the target phrase is set. Herein, no-polarity is set.

Next, in dependency determination 204, it is determined if there is a phrase on which the target phrase is dependent, or a phrase being dependent on the target phrase. If not, the process returns to output result 209, where the current polarity is output as the final result. If there is a dependency structure, the process advances to polarity rule search 205. In the example of 502, because this example has a dependency from X to "oppose", it is determined that there is a dependency structure, and the process proceeds to polarity rule search 205.

In polarity rule search 205, based on the dependency structure with respect to the target phrase, the polarity rule to be applied is searched for. In the example of 502, because this example has a dependency from X to "oppose", "X→oppose" indicated at 601 becomes the polarity determination rule to be applied. If no rule can be found, it is determined that a default rule has been found, the default rule being such that the polarity of the result of dependency Y(X→Y, or Y→X), which indicates the word on which X is dependent or the word being dependent on X, is no-polarity.

In polarity rule application 206, the rule obtained by the search by the polarity rule search 205 is applied. In the example of 502, the rule indicated at 601 is applied, so that the polarity of the dependency as a whole, i.e., the polarity of "oppose x" at 502 becomes plus.

In target phrase setting 207, the target phrase upon application of the rule in polarity rule application 206, and the dependency phrase associated therewith are combined and re-set as the target phrase. In the example of 502, the target phrase X is combined with "oppose", which is the associated dependency phrase upon application of the rule in polarity rule application 206, into "oppose X" that is re-set as the target phrase.

In polarity setting 208, the result of rule application in polarity rule application 206 is used to set the polarity of the target phrase that has been set in target phrase setting 207. If the polarity of the target phrase prior to the processing in target phrase setting 207 is no-polarity or plus, the polarity by the rule of polarity rule application 206 is re-set as the polarity of the current target phrase. If the polarity of the target phrase prior to the process of target phrase setting 207 is minus, the result obtained by inverting the polarity by the rule of polarity rule application 206 is re-set as the polarity of the current target phrase. That is, if the polarity by the rule of polarity rule application 206 is plus, the polarity becomes minus; if minus, the polarity becomes plus; and if no-polarity, the polarity becomes no-polarity. In the example of 502, because the polarity of X is no-polarity, the polarity of the target phrase "oppose X" becomes plus.

Thereafter, the process of dependency presence/absence determination 204 is performed as to whether there is dependency with respect to the target phrase that has been re-set.

Accordingly, in the present invention, the polarity rule is recursively applied with respect to the target phrase, and determination is made by re-setting the target phrase multiple times to determine the final polarity of the text as a whole.

For example, a search is conducted with respect to X, and if the text "Y does not oppose X" is obtained by the search, X is initially set as the determination target phrase R, and the polarity is determined to be no-polarity. Then, the polarity determination rule "R"→oppose is applied, the "oppose X" that has been processed is re-set as the determination target phrase R, and the polarity is determined to be minus.

Then, the polarity determination rule does→"R" concerning "oppose X" is applied, the "does oppose X" that has been processed is re-set as the target phrase R, and the polarity is determined to be minus.

Then, the polarity determination rule not→"R" concerning the target phrase "does oppose X" is applied. Because the polarity determined by this rule is minus, and the polarity of "does oppose X" is also minus, the polarity of the text "does not oppose X" is determined to be plus.

Finally, while Y→"does not oppose X", since "Y" is a variable, there is no rule that can be directly applied, so that the default rule is applied and no-polarity is determined.

Accordingly, the result of polarity determination for the text as a whole is plus, which is the polarity of "does not oppose X". From the above process, it is determined that "Y does not oppose X" is plus with respect to the target phrase "X".

In the foregoing, in the case where there is no rule that can be applied, the default rule is prepared and the process in which the polarity is not changed is performed. Alternatively, in that case, information indicating that the default rule has been applied may be left, so that the subsequent process may be informed of low reliability of the processing result.

In the case where there is a plurality of applicable polarity rules, the polarity rule search 205 searches for and selects the longest (the most special) rule. For example, in the case of the sentence "Y is for X", the dependency structure as indicated at 508. Accordingly, if rules 602 and 603 of FIG. 6 are sequentially applied, the result will be no-polarity. However, because the sentence indicates that X is being approved, plus polarity is desirable. Accordingly, the target phrase that is re-set after the longer rule 604 is preferentially applied will be "is for X". In this way, when a plurality of polarity rules are found in polarity rule search 205, a search for a longer rule is conducted, and if there is a longer rule, that rule is applied. By applying the longest rule as a result of the search, the polarity with respect to the target phrase can be appropriately determined even if the text has a complex dependency.

Several examples of conventional sentence polarity determination methods will be described. The positive/negative determination is made without particularly designating the target phrase. There are several types of positive and negative. Examples are the polarity of emotion, such as good emotion or bad emotion, and the polarity of event, such as a good event or a bad event. An example of emotion is "like apples" (positive). An example of event is "won a marathon (positive). The polarity determination is made on for each type by, for example, using a different dictionary for each type.

In one method, polarity information indicating plus, minus, or no-polarity is provided to the words, and the number of words in the sentence that have each of the polarities is counted so as to determine the polarity of the sentence. For example, the polarity information is attached to each word by attaching "positive" to words such as "like" and "love"; "negative" to words such as "dislike" and "hate"; and "no-polarity" to words such as "see" and "go". Then, in the sentence, the positive words are given +1, the negative words are given −1, and the total numbers are counted. If the result is plus, it is determined that the polarity is plus; if the result is minus, it is determined that the polarity is minus. In the case of a sentence such as "It prevents infection", for example, the sentence means to prevent infectious diseases and should therefore be positive. However, since both "prevents" and "infection" are negative words, the sentence as a whole is determined to be negative.

Accordingly, a method by an n-gram may be contemplated whereby the polarity is determined on the basis of not just one word but statistics of the number of appearances of adjacent n or less words. For example, "prevents infection" will be plus polarity. However, in the case of "It prevents aging and disease", for example, because "prevent" and "disease" are spatially distant, it will be necessary to take up to 4-grains. However, if n of n-gram is increased too much, problems may arise due to a huge quantity of combinations that must be statistically processed, such as decreased reliability, increased dictionary, and increased computing amount. In addition, it is difficult to control the size of n in accordance with the word, and often a flat value is set. Realistically, 3-grams at most is typically utilized.

Accordingly, in Non Patent Literature 1, polarity determination which utilizes a dependency structure is conducted. In the case of dependency, an example has a dependency from "disease" to "prevents", so that the correct polarity can be determined by the simple proximity dependency relationship. By thus using a relationship by dependency rather than spatial arrangement, a polarity determination based on a semantic proximity relationship can be performed. However, in Non Patent Literature 1, the polarity of a sentence as a whole is determined, rather than designating the target phrase and then determining the positive or negative polarity with respect to the target phrase as in the present embodiment. In addition, the method according to Non Patent Literature 1 is based on machine learning, whereas the method of the present embodiment is a rule-based method that explicitly provides the polarity determination rule. Furthermore, in Non Patent Literature 1, a rule is not recursively applied as in the present embodiment. Generally, in the case of methods based on machine learning, recall is high and precision (accuracy) is low, compared with a rule-based method.

According to the present embodiment, a rule based on dependency is recursively applied with respect to the target phrase. If a determination cannot be made by a recursive of application of a short dependency, a long rule is added. For example, in the case of "Y is for X", a determination cannot be made by repeating the application of a dependency rule for "for" and a dependency rule for "is". In this case, a rule as indicated at 604 is added. By using such recursive rule, a rule can be efficiently expressed, whereby the size of the dictionary and the computing amount during polarity determination can be reduced. Instead of describing the rule using a flat length, a long rule is added for polarity determination only when a determination cannot be made with a short rule. In this way, the size of n (length of dependency) required for efficient polarity determination can be controlled. Accordingly, the rule size (memory amount) can be suppressed, whereby the memory amount or computing amount during polarity determination can be decreased.

Figure 7:
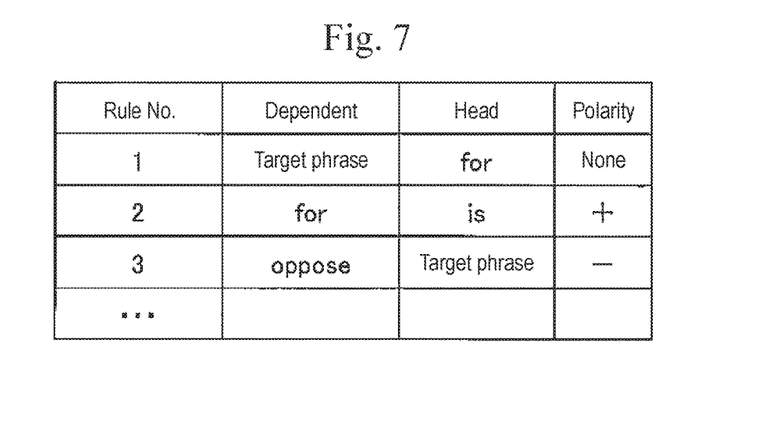
FIG. 7 illustrates an example of polarity determination rules recorded in table form.

FIG. 7 illustrates an example of some of the polarity rules of FIG. 6 recorded in table form. For storage, XML or JSON format, or a binary format may be used.

In the following, several methods for more accurately performing the polarity determination described above will be described.

First, while in the foregoing description, the word or phrase that appears in the node is expressed in the form as appears in the sentence (word surface layer), an arbitrary expression representing the word or phrase may be used. For example, 607 may refer to words having "damage" as the original form, so that 607 can be applied not only to "damage" but also "damages" and "damaged". By thus adopting a configuration applicable to past tense or plurals, the need for newly storing separate rules can be eliminated, whereby the load on the storage unit can be reduced. In addition, parts of speech information and the like may be retained, and a rule may be applicable to words that are verb and have "damage" as the original form, so that the rule can be applied only when "damage" is a verb. By adopting the configuration in which the rule is applicable only to verbs, false determination of words that have different meanings between verb and noun, such as "book", can be reduced. The information of parts of speech and the like may be obtained by means of syntax analysis.

In addition, the rule may be limited by the type of dependency. For example, a dependency rule from the target phrase X to "oppose" may be limited by being made only applicable when X is the object of "oppose". In this case, if X is the subject of "oppose", the rule 601 would not be applied.

There are also homographs, i.e., the words that have the same form but different meanings. Accordingly, a rule may be created for each meaning. In this case, a process for eliminating ambiguity of words, for example, may be performed in advance.

In the present embodiment, the target phrases are basically variables, and the rules of which the polarity does not change depending on the substance of the target phrase are assumed. However, cases may be expected where the polarity changes depending on the target phrase. In such case, information may be added to limit the rule depending on the target phrase. However, such cases can often be avoided by, as described above, limiting the words in advance by a phrase ambiguity elimination process and the like.

Furthermore, the rules may be quantified. For example, between "disagree" and "oppose", "oppose" more strongly represents a will. Accordingly, a value that is greater in minus direction is defined for "oppose". In this case, not only the polarity of plus or minus, but also a value representing the intensity of the polarity is retained. A computation example will be described with reference to the example of "Y does not oppose X". Herein, the polarity value of "oppose" is −2. The polarity value of "not" is −1. While "does" has no-polarity, its value is 1. First, the rule 601 is applied. If the polarity of the target phrase is no-polarity, the polarity value of the rule is taken as the polarity value as is. Then, there is a dependency from "does" to "oppose", but since "does" has no-polarity, and its sign is not changed; however, multiplication is performed using the polarity value of "does", i.e., 1.1. This is used when, e.g., emphasizing a word. At this point in time, the target phrase is "does oppose X", and the polarity value is −2×1.1=−2.2. Then, there is a dependency from "not". In the case of a negative rule, the polarity is inverted. Accordingly, −2.2×−1=2.2. As in this example, the polarity value is inverted only when the polarity of the rule is negative. While in the example, the polarity value was determined by multiplication, other methods, such as addition, may be used.

As indicated at 608 and 609 in FIG. 6, a rule that blocks a recursive process may be defined. For example, in a sentence such as "It prevents infection, but it has side effects", if "infection" is the target phrase, because the portion referring to "infection" is the portion "It prevents infection", it is not desirable to consider the portion "but it has side effects" as well. However, the dependency structure is as indicated at 509, and, if recursively applied, the latter portion "but it has side effects" would also be affected. Accordingly, for example, if the dependent or the head is a conjunction, such as "but", a rule that blocks the subsequent recursive processing, for example, may be provided for avoidance. Information about the conjunction and the like may be acquired by syntax analysis. In this case, in the process of FIG. 2, the blocked dependency may be flagged, and, in the absence of a dependency that is not blocked during the polarity rule search 205, the process immediately returns to the dependency presence/absence determination 204. In the dependency presence/absence determination 204, the presence or absence of a dependency that is not blocked is determined.

Figure 2:
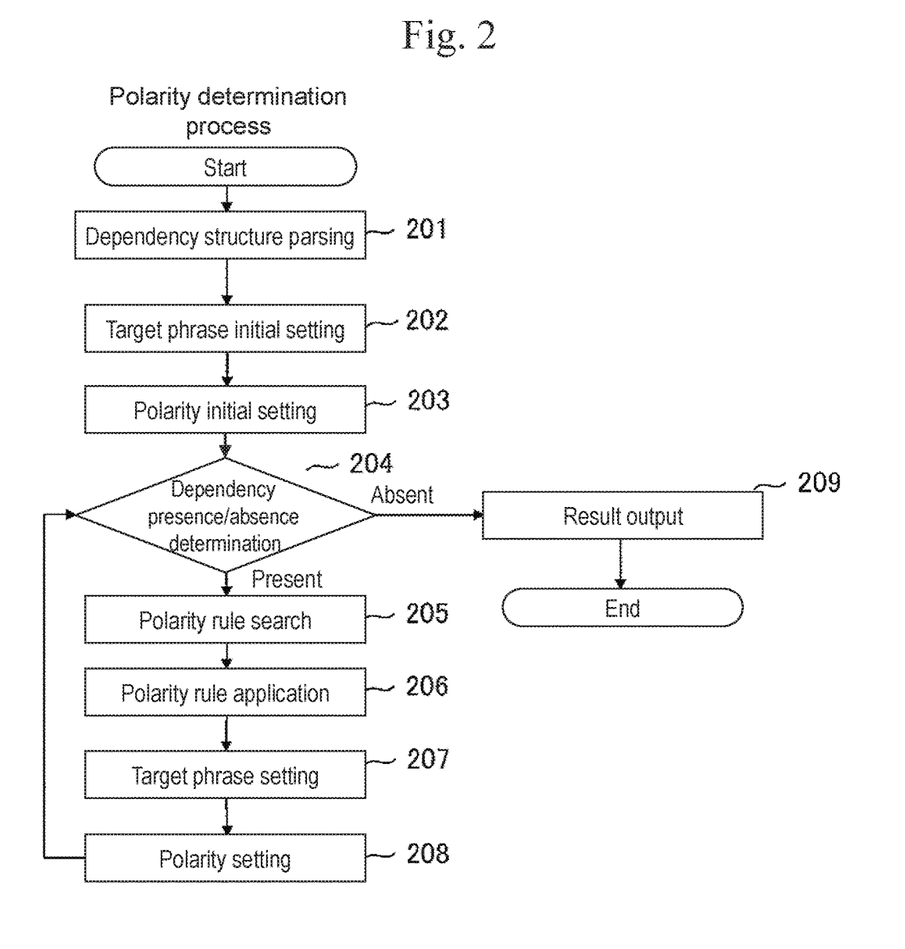
FIG. 2 illustrates a polarity determination procedure.

While in the example of polarity determination using FIG. 2, the polarity of the target phrase that is input together with the input sentence has no-polarity, polarity information may be added. In that case, the polarity given in the polarity initial setting 203 is set. For example, if the sentence "It prevents infection" and the target phrase "infection" are given with no-polarity, the polarity determination result will be minus; however, if "infection" is given with minus polarity, the polarity determination result will be plus. In the case of this example, the polarity corresponds to the polarity of the sentence. However, this is the polarity of the portion of the sentence that is referring to "infection". For example, in the case of "It prevents infection, but it has side effects", the polarity of "but it has side effects" is not considered.

In addition, in the above description, the input sentence and the target phrase (and the polarity of the target phrase) are given. However, this method can also be extended to a case where the target phrase is not given. An example of such extension will be described with reference to FIG. 8. First, a sentence is input.

Figure 8:
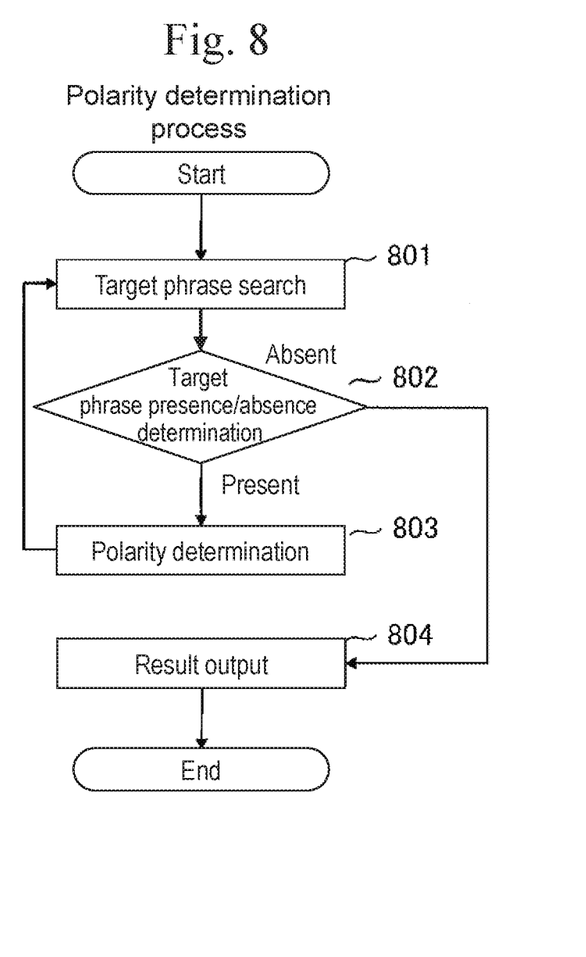
FIG. 8 illustrates the flow of a polarity determination process.

In target phrase search 801, a search for the portion being referred to, i.e., what the sentence is referring to. A specific process example will be described. The input sentence is searched for a noun or noun phrase that is not the dependent. This is the portion that constitutes the root node when the structure is indicated using an arrow from the head to the dependent.

Then, in target phrase presence/absence determination 802, it is determined whether the target phrase has been found in target phrase search 801. If it has, the process proceeds to polarity determination 803; if not, the process proceeds to result output 804.

Next, in polarity determination 803, using the input sentence and the target phrase obtained by the search in target phrase search 801 as the input sentence and the target phrase, respectively, in the polarity determination process of FIG. 2, and polarity determination is performed by the method of FIG. 2. Then, in target phrase search 801, a search for a target phrase yet to be processed is conducted.

In result output 804, an output regarding the pair of the target phrase and the polarity determination result is provided. If there was no target phrase, that result is output.

By this method, it becomes possible to perform polarity determination including the information about the portion being referred to, i.e., as to with respect to what the input sentence is positive or negative.

In result output 209 or result output 804, not only the polarity determination result, but also an output regarding the portion of the polarity rule tree shown in FIG. 6 that has been applied may be simultaneous provided. In addition, the tree structure may be reconstructed in the order of application and displayed. By thus displaying the rules that have been applied, the user can learn the reason or grounds for the polarity determination.

Thus, the text search system according to the present embodiment includes the search unit that searches for a text including a search target phrase that has been input; the determination unit that determines the polarity of the text obtained by the search; and the output unit that outputs a determination result. The text search system is characterized in that the determination unit sets the search target phrase as a first determination target phrase; determines the polarity of a first phrase that has a dependency relation with the first determination target phrase; sets the group of the first determination target phrase and the first phrase as a second determination target phrase; and determines the polarity of the second phrase that has a dependency relation with the second determination target phrase, thereby determining the polarity of the text.

The text search method according to the present embodiment includes the first step of searching for a text including a search target phrase that has been input; a second step of determining the polarity of the text; and a third step of outputting a determination result. The text search method is characterized in that the second step includes a process of setting the search target phrase as a first determination target phrase; determining the polarity of a first phrase that has a dependency relation with the first determination target phrase; setting the group of the first determination target phrase and the first phrase as a second determination target phrase; and determining the polarity of the second phrase that has a dependency relation with the second determination target phrase, thereby determining the polarity of the text.

In this way, starting from the determination target phrase, the determination target phrase is updated to the first determination target phrase, the group of the first determination target phrase and the first phrase, and so on, until eventually all of the phrases that are present in the text are determined. Accordingly, it becomes possible to determine the polarity with respect to the phrase as the portion being referred to in the sentence, rather than the polarity of the sentence per se.

Second Embodiment

Figure 4:
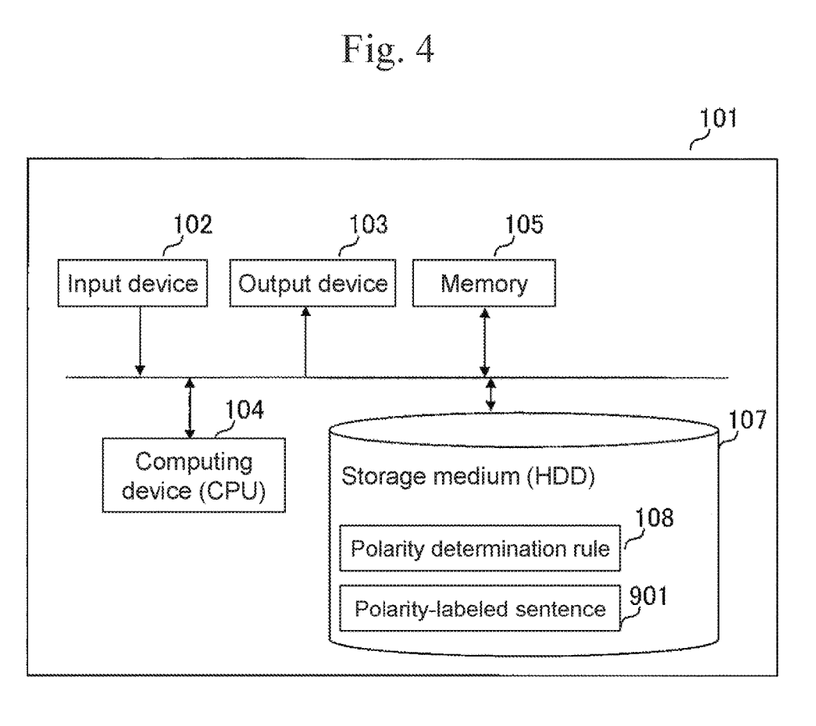
FIG. 4 illustrates an example of a method for creating a polarity determination rule.

In the first embodiment, a method for performing polarity determination with respect to the input sentence, or the input sentence and the target phrase, has been described, on the assumption that the polarity rule is given in advance. The polarity rule may be constructed manually. However, in the present embodiment, a method for efficiently creating the polarity rule by adding or deleting the polarity rule on the basis of cases of false determination of polarity will be described. The configuration is illustrated in FIG. 4. Polarity-labeled sentences 901 are a group of sentences, target phrases in the sentences, and polarity labels, and are created in advance manually or by machine learning, for example. Other elements of the present embodiment are similar to those of the first embodiment and their descriptions are omitted.

In the present embodiment, a polarity rule is added to or deleted from the polarity determination rule 108. The polarity determination rule 108 may be a simple one created manually in advance, or an empty rule.

Figure 3:
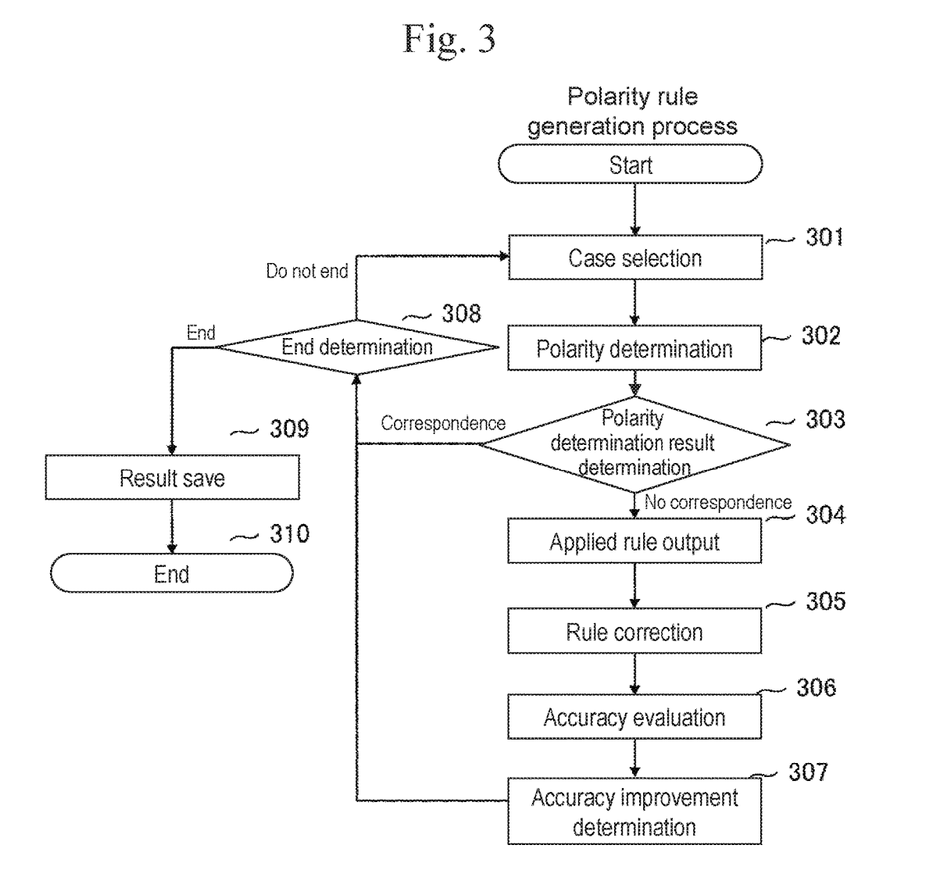
FIG. 3 illustrates an example of a polarity determination rule correction method.

In the following, an example of a method for correcting a polarity rule on the basis of a case of false determination of polarity will be described with reference to FIG. 3.

In case selection 301, one group (case) of a sentence and a target phrase is selected from the polarity-labeled sentences 901. During case selection, a case may be selected randomly or based on a certain rule, such as sequentially.

In polarity determination 302, with respect to the sentence and target phrase selected by the case selection 301, polarity determination is performed on the basis of the polarity determination rule 108 by the method according to the first embodiment.

In polarity determination result determination 303, correspondence or no-correspondence in terms of plus, minus, or no-polarity polarity between the polarity determination result in determination 302 and the polarity noted in the polarity-labeled sentences 901 is examined. In the case of correspondence, the process proceeds to end determination 308. In the case of no-correspondence, the process proceeds to applied rule output 404.

In applied rule display 304, only the rule used in the polarity determination 302 is output as a partial tree. Of the polarity determination rule, the portion of the rule that has been applied in the polarity determination 302 becomes the object of correction.

In rule correction 305, a rule correction candidate is generated by various methods so that the case selected in case selection 301 is subjected to correct polarity determination according to the rule of applied rule display 304 (so that a determination that corresponds to the result noted in the polarity-labeled sentences 901 is made). Herein, the candidate may be generated automatically, or manually with reference to the result of applied rule display 304. When the candidate is automatically generated, a candidate that enables correct determination of the selected case is generated by operations such as addition or deletion of a node, polarity change, and changes in node expression or edge limitation.

Figure 9:
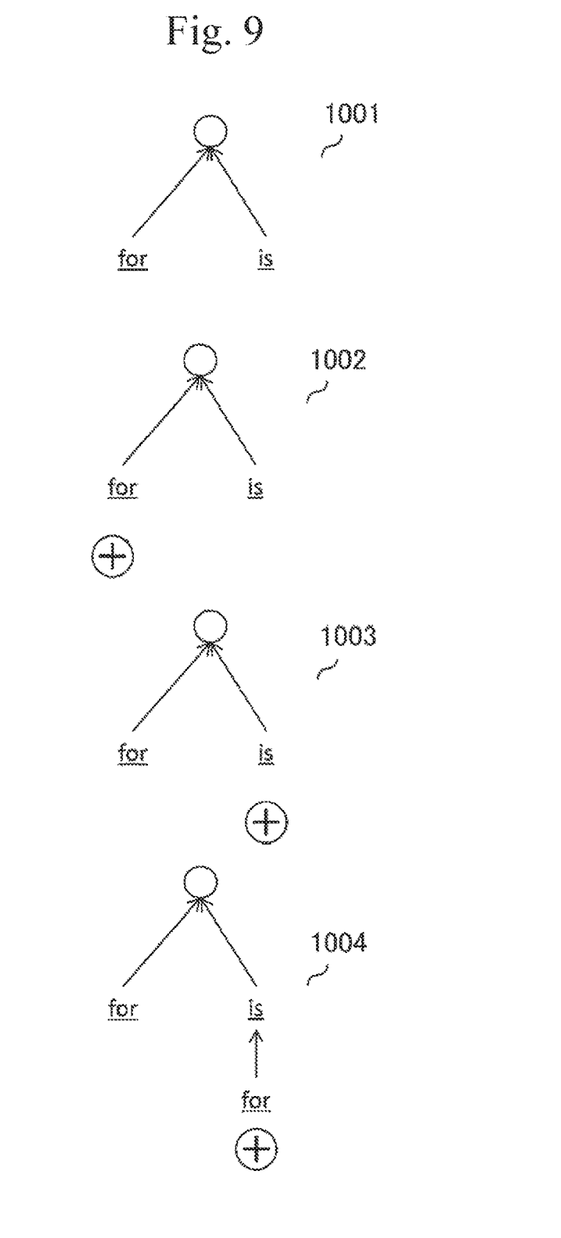
FIG. 9 illustrates examples of partial rules.
Figure 10:
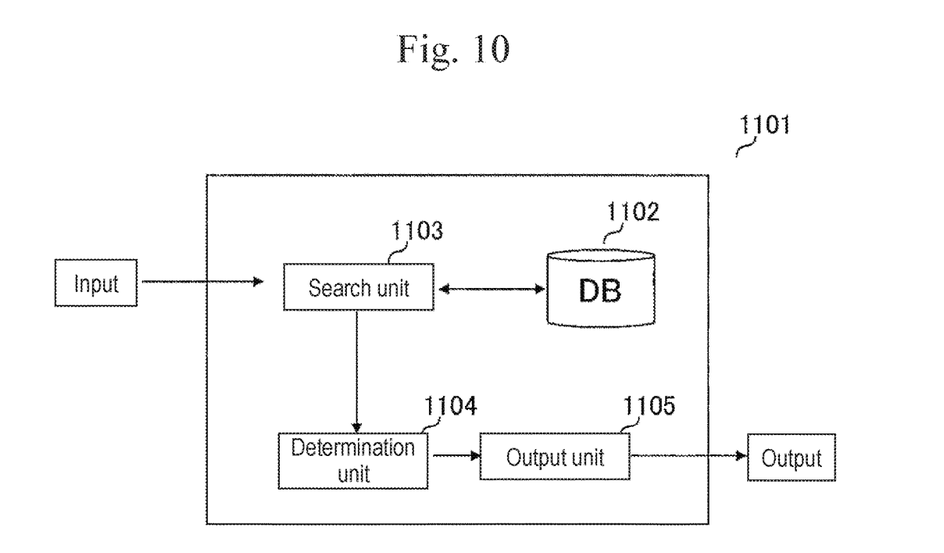
FIG. 10 illustrates a configuration example of a polarity determination device according to a first embodiment of the present invention.

For example, it is assumed that, when the selected case is "Y is for X", the rule 604 in FIG. 6 was nonexistent. In this case, while the polarity of the sentence is no-polarity, if a correct polarity label is attached in the polarity-labeled sentences 901, the polarity will be plus. The applied partial rule (result of applied rule display 304) will be as illustrated at 1001 in FIG. 9. In this case, for example, rule correction candidates 1002, 1003, and 1004 illustrated in FIG. 9 may be conceivable. This correction is applied to the original polarity determination rule 108 to generate a polarity determination rule candidate.

Then, in accuracy evaluation 306, with respect to each polarity determination rule candidate, the correspondence ratio (accuracy) between the result of determination, by polarity determination 302 using the polarity determination rule candidate, of the case of the polarity-labeled sentences 901, and the label of the polarity-labeled sentences 901 is computed. During the accuracy evaluation, if the polarity determination is performed for all of the cases, the computing amount would be increased and efficiency would suffer. Accordingly, the results of polarity determination by a rule prior to rule correction may be stored in advance, and only those cases that are affected by the rule correction (for example, the cases including a word of a corrected portion) may be considered the object for re-determination, thereby increasing the efficiency of the accuracy evaluation.

In accuracy improvement determination 307, when, of the accuracies computed in accuracy evaluation 306, the highest one is h1, and the accuracy at the time of using the polarity determination rule prior to the process of the rule correction 305 is h2, if h1 becomes greater than h2 according to a predetermined reference, it is determined that there was accuracy improvement. Then, the polarity determination rule candidate that provided the accuracy h1 is adopted as the polarity determination rule 108.

In end determination 308, it is determined whether to end the process or not. For example, it is determined that the process is to end when the cycle from case selection 301 to end determination 308 has been conducted a certain number of times or more without accuracy improvement; when the end determination process has been performed a certain number of times or more; or when the cycle of selecting the cases during case selection has been performed a certain number of times or more. If it is determined that the process is not to end, the process returns to case selection 301. If it is determined that the process is to end, the process proceeds to result save 309.

In result save 309, the polarity determination rule 108 that has been finally generated is saved.

It is costly to manually create a polarity determination rule of tree structure. In comparison, creating a case provided with a polarity label does not require much prior knowledge, and is not so burdensome. Accordingly, by the process according to the present embodiment, the polarity determination rule can be efficiently generated.

The polarity label may be provided by machine learning. Compared with a rule-based method, the machine learning method tends to provide low precision (accuracy) but high recall. That is, while the rule-based method may be unable to make a determination should an unknown pattern appears, the method has a high likelihood of making a correct determination if a rule is present. On the other hand, the machine learning method generates a feature quantity even with respect to an unknown pattern, and makes a generalizable, statistically likely determination based on statistics in a feature space. Accordingly, the machine learning method is robust with respect to unknown patterns. This property may be taken advantage of by providing labels using a determination unit created by machine learning with respect to large volumes of data, and the cases may be used as the polarity-labeled sentences 901.

REFERENCE SIGNS LIST 101, 1101 Polarity determination device
102 Input device
103 Output device
104 Computing device
105 Memory
106, 107 Storage medium
1102 Search unit
1103 Storage unit
1104 Determination unit
1105 Output unit

The invention claimed is:

1. A text search system comprising:
a storage unit in which rules for determining a polarity are stored;
a user interface through which a user inputs a search target phrase;
a search unit that performs a search for a text including the search target phrase received from the user interface;
a determination unit that determines a polarity of the text obtained by the search; and
an output unit that outputs a determination result to at least one of a display and a printer,
wherein the determination unit sets the search target phrase as a first determination target phrase, determines a polarity of a first phrase that has a dependency relation with the first determination target phrase, sets a group of the first determination target phrase and the first phrase as a second determination target phrase, and determines a polarity of the text by determining a polarity of the second phrase that has a dependency relation with the second determination target phrase, and
wherein the rules vary in length and the determination unit, when determining the polarity, determines the polarity using a longest rule among the rules.

2. The text search system according to claim 1, wherein the determination unit determines parts of speech of the first and second determination target phrases and the first and second phrases, and determines a rule used for polarity determination based on the parts of speech.

3. The text search system according to claim 1, wherein the determination unit, when determining the polarity, outputs a latest result of polarity determination as the polarity of the text if the second phrase that has a dependency relation with the second determination target phrase is a conjunction.

4. A polarity determination rule correction system comprising:
a storage unit in which a text provided with a polarity, a target phrase included in the text, and a rule for determining a polarity are stored;
a polarity determination unit which determines a polarity of the text by setting the target phrase as a first determination target phrase, determining the polarity of a first phrase that has a dependency relation with the first determination target phrase, setting a group of the first determination target phrase and the first phrase as a second determination target phrase, and determining a polarity of the text by determining a polarity of the second phrase that has a dependency relation with the second determination target phrase;
a generation unit which, if the polarity the text is provided with and the polarity determined by the polarity determination unit are different, generates a new rule candidate such that the two polarities correspond to each other;
a calculation unit which calculates a degree of correspondence between a polarity determined using the rule candidate and the polarity the text is provided with; and
a rule registration unit which stores the rule candidate having the highest degree of correspondence in the storage unit as the rule.

5. A text search method comprising:
storing rules for determining a polarity in a storage unit receiving an input from a user via a user interface, the input including a search target phrase;
conducting a search for a text including the search target phrase received from the user interface;
determining a polarity of the text; and
outputting a determination result to at least one of a display and a printer,
wherein the determining the polarity of the text includes a process of setting the search target phrase as a first determination target phrase, determining a polarity of a first phrase that has a dependency relation with the first determination target phrase, setting a group of the first determination target phrase and the first phrase as a second determination target phrase, and determining a polarity of the text by determining a polarity of a second phrase that has a dependency relation with the second determination target phrase, and
wherein the rules vary in length and the polarity is determined using a longest rule among the rules.

6. The text search method according to claim 5,
wherein the determining the polarity of the text includes a process of determining parts of speech of the first and second determination target phrases and the first and second phrases, and determining a rule used for polarity determination based on the parts of speech.

7. The text search method according to claim 5, wherein the determining the polarity of the text includes a process of outputting a latest result of polarity determination as the polarity of the text if the second phrase that has a dependency relation with the second determination target phrase is a conjunction.

8. A polarity determination rule correction method comprising:
a first step of storing a text provided with a polarity, a target phrase included in the text, and a rule for determining a polarity in a storage unit;
a second step of determining a polarity of the text by setting the target phrase as a first determination target phrase, determining a polarity of a first phrase that has a dependency relation with the first determination target phrase, setting a group of the first determination target phrase and the first phrase as a second determination target phrase, and determining a polarity of the text by determining a polarity of a second phrase that has a dependency relation with the second determination target phrase;
a third step of generating, if the polarity the text is provided with and the polarity determined by the polarity determination unit are different, a new rule candidate such that the two polarities correspond to each other;
a fourth step of calculating a degree of correspondence between a polarity determined using the rule candidate and the polarity the text is provided with; and
a fifth step of storing the rule candidate having the highest degree of correspondence in a storage unit as the rule.

* * * * *